United States Patent [19]
Wells

[11] 4,342,720
[45] * Aug. 3, 1982

[54] METHOD AND APPARATUS FOR GENERATION OF THERMONUCLEAR POWER

[75] Inventor: Daniel R. Wells, Miami, Fla.

[73] Assignee: Trisops, Inc., Austin, Tex.

[*] Notice: The portion of the term of this patent subsequent to Jan. 10, 1995, has been disclaimed.

[21] Appl. No.: 25,105

[22] Filed: Mar. 29, 1979

Related U.S. Application Data

[63] Continuation-in-part of Ser. No. 954,248, Oct. 24, 1978, abandoned.

[51] Int. Cl.³ .............................................. G21B 1/02
[52] U.S. Cl. .................................. 376/107; 376/140; 376/150; 376/146
[58] Field of Search ........................... 176/1, 3, 7, 2, 5

[56] References Cited

U.S. PATENT DOCUMENTS

| | | | |
|---|---|---|---|
| 2,961,558 | 11/1960 | Luce et al. | 176/7 |
| 2,997,436 | 8/1961 | Little et al. | 176/7 |
| 3,096,269 | 7/1963 | Halbach et al. | 176/2 |
| 3,125,492 | 3/1964 | Baker | 176/5 |
| 3,227,620 | 1/1966 | Cutts et al. | 176/60 |
| 4,068,147 | 1/1978 | Wells | 176/3 |
| 4,166,760 | 9/1979 | Fowler et al. | 176/3 |
| 4,217,171 | 8/1980 | Schaffer | 176/7 |

FOREIGN PATENT DOCUMENTS 2758866  9/1978  Fed. Rep. of Germany .......... 176/3

OTHER PUBLICATIONS

Scientific American, 6/71, vol. 224, No. 6, pp. 21-33.
Controlled Thermonuclear Reactions, Robert E. Krieger Pub. Co. Huntington, New York, 1975, Glasstone et al., pp. 414, 415, 416.
Science, vol. 172, No. 3985, 5/21/71, Rose, pp. 797, 800.

*Primary Examiner*—Harvey E. Behrend
*Attorney, Agent, or Firm*—Browdy and Neimark

[57] ABSTRACT

A thermonuclear fusion reactor assembly consisting of a plurality of TRISOPS theta pinch units arranged in a parallel configuration inside a common magnetic guide field and provided with a common surrounding FLIBE or other suitable molten metal blanket. The primary magnetic guide field is generated by a superconducting magnet assembly surrounding the container in which the bundle of fusion sticks is mounted. A gas distributing valve mechanism is employed to independently and selectively supply gas and purge same in the respective fusion stick units, and an electrical switching mechanism is employed to similarly independently and selectively energize the fusion stick units in a desired timing pattern.

7 Claims, 4 Drawing Figures

METHOD AND APPARATUS FOR GENERATION OF THERMONUCLEAR POWER

This is a continuation-in-part of application Ser. No. 954,248, filed Oct. 24, 1978, the contents of which are incorporated by reference, now abandoned.

FIELD OF THE INVENTION

This invention relates to the generation of electrical energy by thermonuclear processes, and more particularly to a novel and improved method and apparatus for arranging a plurality of TRISOPS reactors in a useful geometry.

BACKGROUND OF THE INVENTION

There currently exists a need for new techniques permitting the construction of power generating stations that are relatively small as compared with conventional reactor designs. For example, it is desirable that large-capacity power generating thermonuclear reactors be built in sizes of the order of 1000 times smaller than those possible with currently projected devices, to enable the utilization of these machines in spacecraft intended for deep space missions, or for utilization for marine propulsion. In these and other applications it may also be required to provide more direct conversion of thermonuclear energy to electrical energy than is available with conventional thermonuclear energy-converting apparatus.

For various additional reasons the present technology does not provide devices meeting the above criteria. Although heating plasma structures by magnetic mirror compression provides a basic solution, all previous attempts to do so have provided unsatisfactory results because the current methods involve heating a plasma ring that is moving with respect to the compression coils. This results in a very low coefficient of coupling and a very inefficient heating process. Furthermore, the rate of rise of the compression field in conventional devices must be very fast, requiring the use of expensive, complex, and bulky equipment.

Therefore there currently exists a need for more efficient and less expensive means for compressing and heating significant amounts of plasma in thermonuclear devices. There is also a need for a multi-unit reactor assembly which is easier to maintain in operation or replace parts than in the currently available reactor designs.

A typical background publication showing the present state of the art is U.S. Pat. No. 4,068,147, dated Jan. 10, 1978, to Daniel R. Wells.

SUMMARY OF THE INVENTION

The present invention is directed to a method and means for arranging a plurality of TRISOPS reactor elements, or "fusion sticks" in a configuration such as to economically and conveniently harness the energy generated by each fusion stick. The apparatus may comprise, in a typical embodiment, a set of seven or more fusion sticks arranged in a "bundle" which is surrounded by a single Lithium or FLIBE blanket and one superconducting solenoid magnet which acts as a guide field for the plasma in all the seven sticks. The steady state field produced by the superconducting magnet confines and guides the plasma vortex rings generated in each stick to collision at the centers of the containment vessels. The secondary mirror field of each stick effects compression of the plasma at the center of the stick. Each stick may fire at desired intervals, for example, once every second. The gas in each stick may be periodically purged, for example, at every 4th firing. The compression coils of each stick are powered by flywheel generators or capacitor banks, and these energy sources may be arranged to power three sticks before renewal of their energy. The compression magnetic fields are preferably derived from superconducting magnets, although this is not a critical requirement for proper operation of the invention. Since each fusion stick is arranged for independent energization and is provided with valve means for independent gas supply and purging, malfunction of any given stick can be easily corrected by removing said stick and replacing it with a standby stick assembly.

Since a fusion stick based on the TRISOPS principle (disclosed in U.S. Pat. No. 4,068,147, above mentioned) can be built so that it produces as little as one megawatt of power, a one-, two- or three-stick bundle would correspondingly allow a 1, 2 or 3 megawatt reactor to be constructed, suitable for marine propulsion, locomotive propulsion and spacecraft propulsion for deep space missions.

Accordingly, it is a principal object of the invention to provide a unique and practical geometry for the construction of a thermonuclear reactor based on the TRISOPS principle, which overcomes the deficiencies and disadvantages of the currently available reactors.

A further object of the invention is to provide a simple thermonuclear reactor of relatively cheap design which will be many orders of magnitude less expensive to construct than those based on the Tokamak or other conventional fusion reactor approaches.

Another object is to provide for the convenient treatment of radioactive waste and/or the breeding of nuclear fuel for fission power plants by replacing one or more sticks or the surrounding FLIBE blanket with either radioactive fission waste material or nuclide breeding elements respectively.

A still further object of the invention is to provide an improved thermonuclear reactor assembly having a geometry which will allow operation of many fusion sticks utilizing only one guide field, and wherein said guide field is produced by a cryogenically-cooled surrounding magnet.

A still further object of the invention is to provide a convenient and practical geometry for a thermonuclear reactor assembly such that one surrounding Lithium or FLIBE blanket of simple cylindrical geometry can be used to surround many individual fusion sticks.

A still further object of the invention is to combine a plurality of TRISOPS assemblies in a convenient geometry so that the injection of gas, the energization of conical theta pinch coils, the energization of compression coils, and the purging of spent gas can be easily and cheaply accomplished, at the same time allowing simple and economical replacement and repair of individual fusion sticks.

BRIEF DESCRIPTION OF THE DRAWINGS

Further objects and advantages of the invention will become apparent from the following description and claims, and from the accompanying drawings, wherein:

DETAILED DESCRIPTION OF A PREFERRED EMBODIMENT

Thermonuclear devices of the type comprehended by the present invention commonly employ means for heating and compressing plasmas to thermonuclear temperatures. However, the means employed generally involves extremely complex geometries of coil windings, cooling passages, and blanket passages. These inherent difficulties result from an attempt to force the plasma into a stable equilibrium state by the application of complex external windings. The basic TRISOPS geometry allows the plasma to form itself into a naturally occurring stable state. In this way most of the design and construction complexities are eliminated. Each fusion stick consists of sets of simple solenoidal coils wound around a tapered cylindrical vacuum chamber. These fusion sticks are operated in parallel inside of one large surrounding Lithium or FLIBE blanket and cryogenically cooled guide field solenoid.

Figure 1:
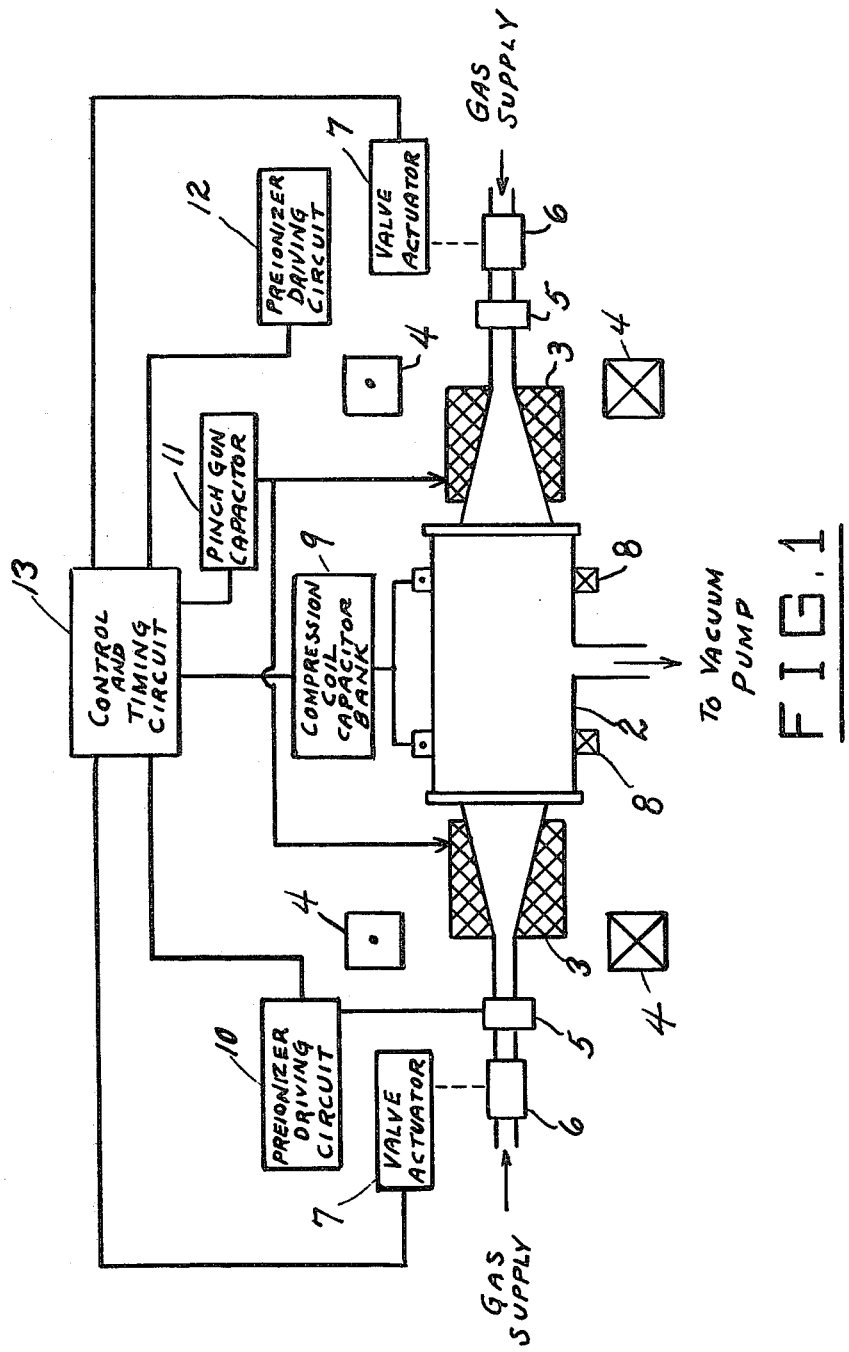
FIG. 1 is a schematic diagram of a conventional TRISOPS assembly forming one of the fusion stick units employed in a multifusion stick assembly in accordance with the present invention.

Apparatus designed to give effect to this technique is illustrated in the drawings. Referring now to FIG. 1, plasma vortex structures or rings are generated by conical theta pinch guns 3 and are injected thereby into vacuum containment vessel 2. Plasma is supplied to pinch guns 3 from the system gas supply through gas valves 6 and preionizers 5. Theta pinch guns 3 are driven from pinch gun capacitor 11. The preionizers 5 are driven by preionizer driving circuits 10 and 12. Pulsed operation of the system is accomplished by controlling gas valve actuators 7 and the pinch guns and preionizers by control and timing circuits 13. The plasma rings generated by pinch guns 3 are confined and guided to the center of the containment vessel 2 by means of a steady state magnetic mirror field generated by primary magnetic mirror 4. A secondary magnetic mirror field for compressing plasma in the vicinity of the center of the containment vessel is established by means of secondary magnetic mirror 8 which is driven by compression bank 9 in response to the operation of control and timing circuits 13.

In operation, the plasma ring moving parallel to the primary mirror field has its velocity and magnetic fields anti-parallel (contrarotational). The plasma ring moving anti-parallel to the primary mirror field has its velocity and magnetic fields parallel (corotational). Both rings are force-free, e.g., $\vec{J}\times\vec{B}=0$ and $(\nabla\times\vec{V})\times\vec{V}=0$. Thus, the contrarotational ring is right handed in $B_\theta+B_\phi$ and the corotational ring is left handed in $B_\theta+B_\phi$, where $B_{74}$ is the toroidal component of the trapped magnetic induction field in the rings and $B_\theta$ is the corresponding trapped poloidal field. They then collide and are amplified and compressed by the secondary mirror system located at the center of the primary mirror system. The current flow in the secondary compression coils is in the same direction as the currents flowing in the primary mirror coils 4. Thus (by Lenz's law) they both compress the vortex rings and amplify their currents. The diamagnetic currents in the rings increase as the current in the secondary compression coils increases. The toroidal currents in the two rings are in the same direction. The poloidal current components are in opposite directions. The rings currents are left-handed and right-handed helices. This geometry is illustrated in the drawing.

Figure 2:
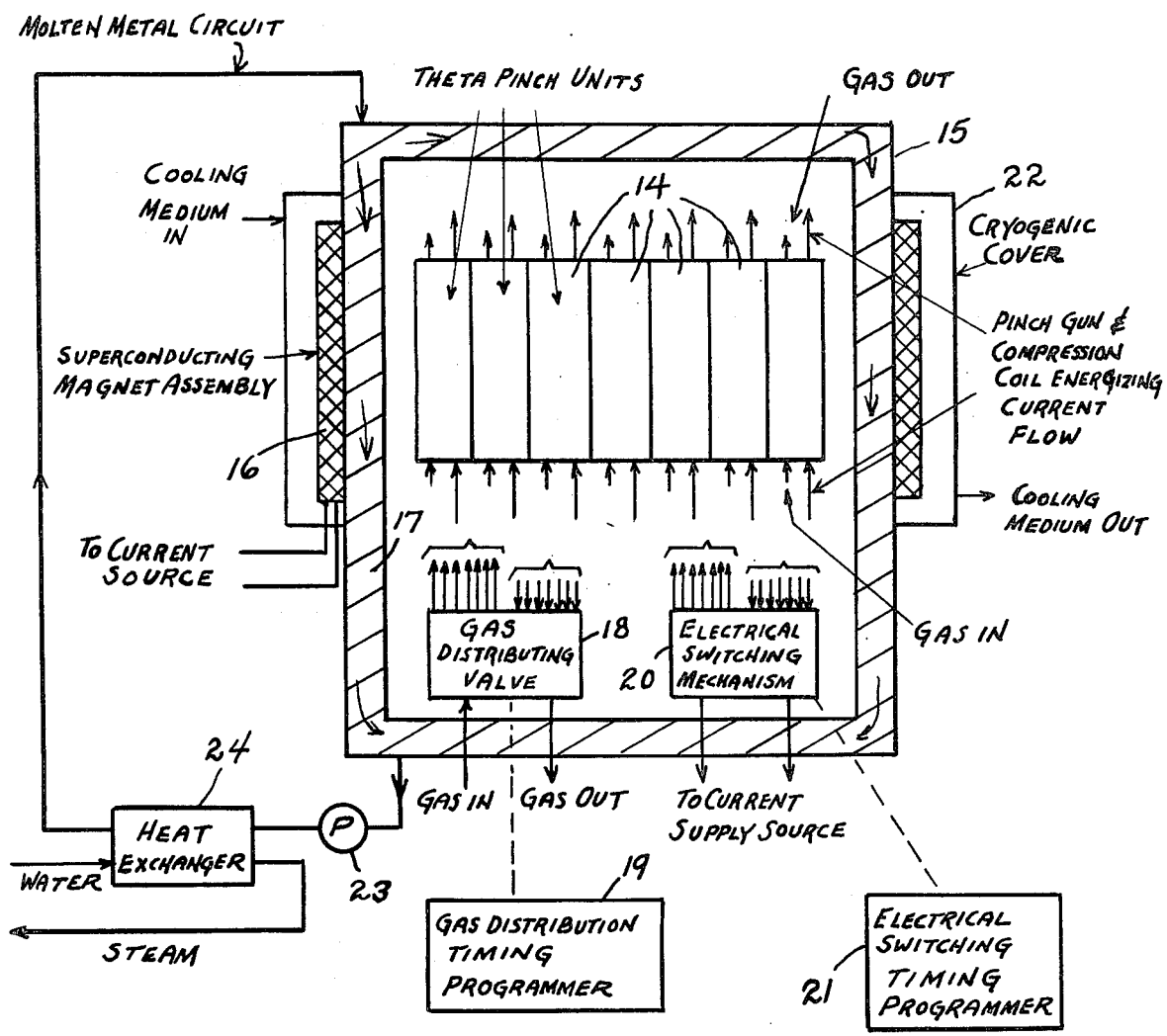
FIG. 2 is a schematic block diagram of a typical multifusion stick assembly according to the present invention, employing TRISOPS stick assemblies similar to that shown in FIG. 1.

FIG. 2 illustrates diagrammatically an embodiment constructed in accordance with the present invention, wherein a plurality of TRISOPS assemblies, shown at 14, are mounted in parallel relationship as a bundle, and are vertically positioned in a suitable container or housing 15, which is surrounded by a common cryogenically cooled solenoidal guide field coil 16 and which is internally provided with a Lithium or FLIBE blanket 17. The individual fusion sticks 14 operate entirely independently of each other in that each is supplied independently with gas, such as deuterium, tritium, or some other suitable element, and is likewise independently purged, for example, via a conventional gas distributing valve mechanism 18 which may be controlled by a conventional timing programmer 19, as is diagrammatically illustrated in FIG. 2. The programmer 19 may be set to operate the valve mechanism 18 so as to cause each stick 14 to be charged and purged at regularly spaced intervals. For example, the timed valve mechanism 18 may be actuated to allow each stick to fire once each second and to cause each stick to be purged every 4th firing.

Similarly, each fusion stick 14 is electrically energized independently by means of a conventional switching mechanism 20 which may be timed by a conventional timing programmer 21. As above described, the compression coils of the respective fusion sticks 14 are powered by electrical generators or capacitor banks, and the switching mechanism 20 may provide suitable timing of these energy sources. For example, the switching mechanism 20 may be set to allow these energy sources to power 3 sticks 14 before renewing their energy.

As shown diagrammatically in FIG. 2, the superconducting magnet assembly 16 may be cryogenically cooled by being contained in a jacket 22 surrounding housing 15 and provided with inlet and outlet conduit means to circulate cooling medium through the jacket.

The molten metal of the blanket 17 internally covers both the sides and the top and bottom walls of housing 15 around the fusion sticks 14, and is circulated by means of a pump 23 through a heat exchanger 24 to utilize the thermonuclear-generated heat so as to heat water and produce steam for the generation of electrical energy.

The blanket 17 covers the interior surface of the main housing around the fusion sticks in order to absorb any and all thermonuclear neutrons generated by the sticks. The neutrons heat the blanket 17 by secondary nuclear reactions. The heated, molten metal is pumped through the heat exchanger 24, as above described, to utilize the generated heat absorbed in the molten metal blanket.

The superconducting magnet assembly 16 supplies the magnetic guide field for the vortex structures moving toward the centers of the sticks 14 for all the respective sticks. In a typical example, shown more specifically in FIGS. 3 and 4, seven sticks 14 are employed. However, any desired number of sticks 14 may be employed, according to service requirements.

Figure 4:
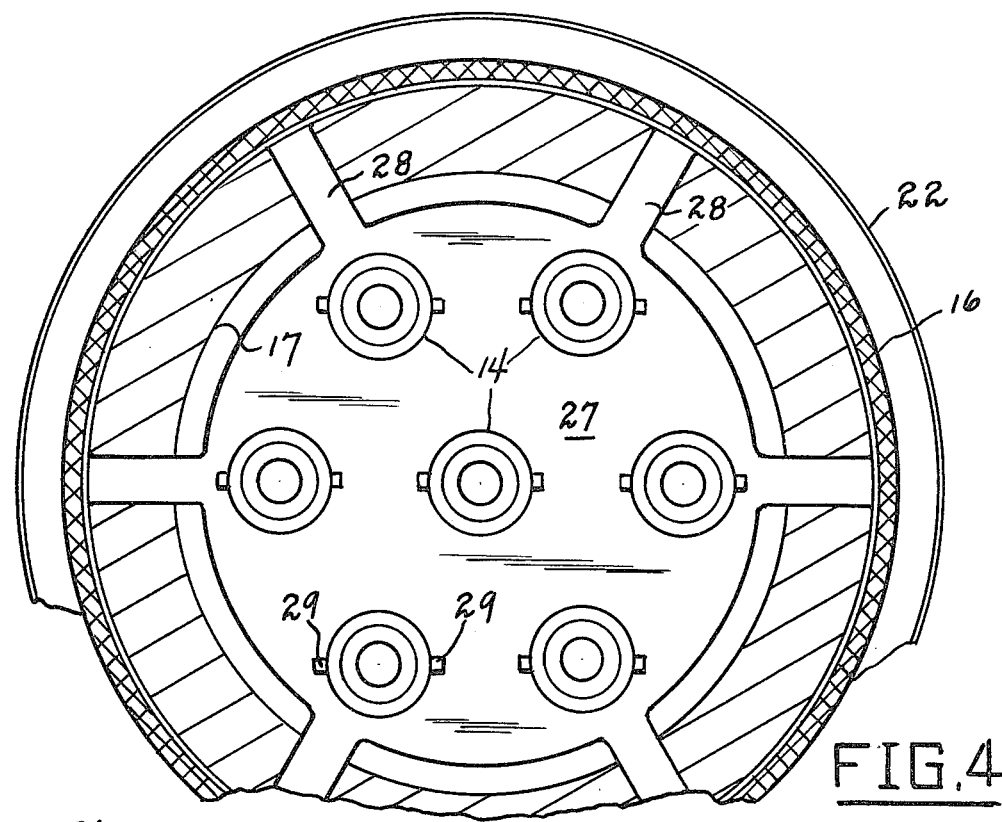
FIG. 4 is a fragmentary horizontal cross-sectional view taken substantially on the line 4—4 of FIG. 3.
Figure 3:
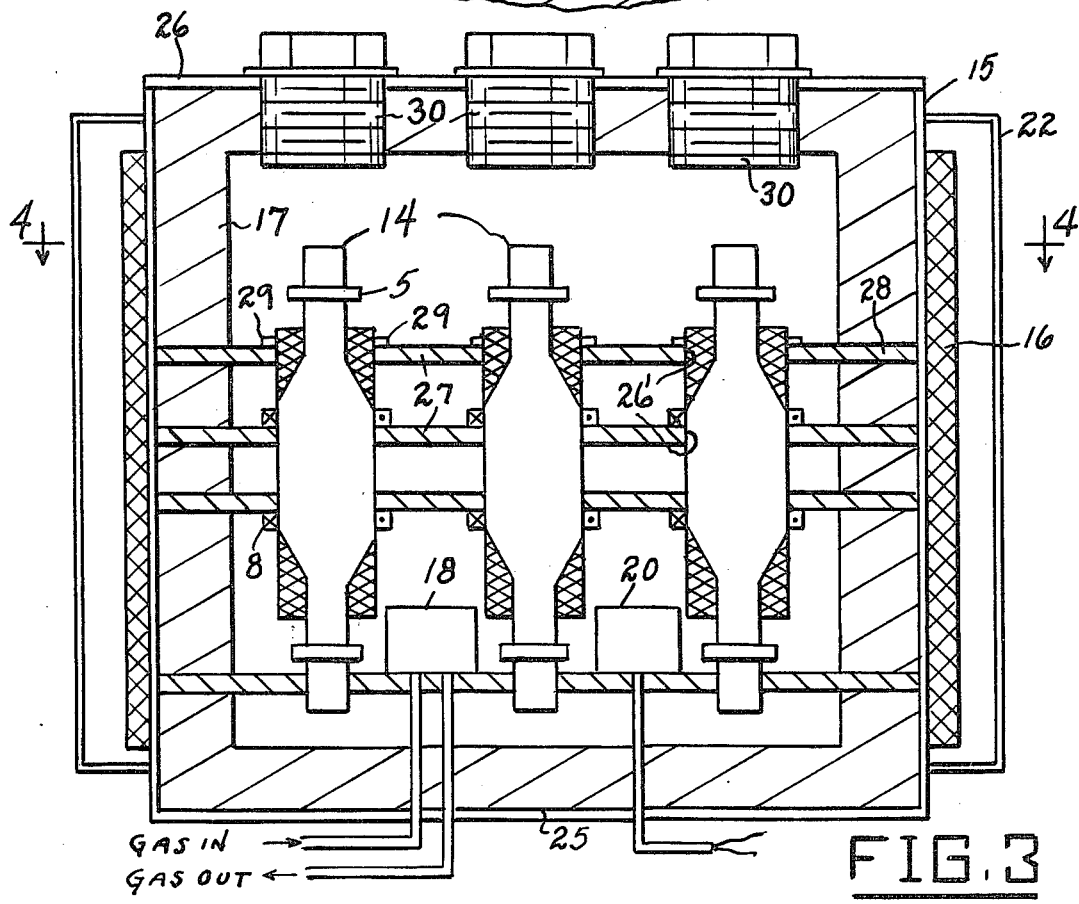
FIG. 3 is a vertical cross-sectional view taken through a typical multi-fusion stick assembly according to FIG. 2.

In the specific embodiment shown in FIGS. 3 and 4, the housing 15 is generally cylindrical, is of suitable heat-resistant non-magnetic material, and has a circular bottom wall 25 and a circular removable top cover plate 26 secured by conventional fastening means, not shown. Housing 15 is preferably arranged with its axis vertical, as shown. Seven fusion sticks 14 are vertically arranged in the housing, being slidably engaged through vertically aligned apertures 26 provided in a plurality of circular, vertically spaced horizontal bulkhead plates 27 rigidly secured coaxially in housing 15, for example, by integral spaced radial peripheral arms 28 on said plates 27, extending outwardly therefrom and rigidly secured to the inside surface of the cylindrical wall of housing 15. The compression coils 8 may be fixedly mounted on the bulkhead plates 27 around the margins of the guide apertures 28. Radial supporting lugs 29 may be provided on the upper end portions of the fusion stick assemblies 14 to support the sticks in operating positions, as shown in FIG. 3.

Vertically aligned with the respective fusion sticks 14 are removable access plugs 30 mounted in the top cover plate 26, providing access to the fusion sticks for removal for repair or replacement, as required. The fusion sticks and bulkhead plates 27 are provided with cooperating electrical contacts, not shown, for automatically establishing the required electrical energizing connections with the switching mechanism 20 when the fusion sticks are inserted. Gas connections are made with the valve mechanism 18 by suitable conventional conduit means, not shown, including conventional quick-detachable couplings.

The parallel fusion sticks 14 may be arranged in any desirable pattern affording adequate free travel of neutrons toward the metal blank 17. For example, as shown in FIG. 4, the seven fusion sticks are arranged with one stick 14 located at the center and the remaining six sticks 14 located at the same radial distance near the peripheries of the bulkhead plates 27 and angularly spaced evenly around the central stick. This arrangement provides minimum obstruction to outward travel of neutrons from the central fusion stick toward the blanket 17.

It is understood that part or all of the Lithium or FLIBE blanket 17 can be replaced by $238_U$ and/or $232_{Th}$ (Uranium 238 and/or Thorium 232) to provide for neutron capture in fertile material in order to produce fissile fuel ($239_{Pu}$, $233_U$, namely, Plutonium 239, Uranium 233) for use in fission reactors. The blanket, under these circumstances, may or may not produce heat energy for use in generating electricity.

The invention can also be used for the convenient treatment of radioactive waste. Thus, the Lithium or FLIBE blanket can be replaced in whole or in part by actenides (radioactive wastes) for processing by the neutron flux. Or radioactive wastes from fission plants or otherwise generated can be safely treated by placement in containers located among the fusion stick array, preferably in the location of the center fusion stick. Combinations of these means may be used, the only requirement being there be a sufficient number of sticks in suitable geometry that the neutron flux through the waste be high enough to effect the required transmutation.

While a specific embodiment of an improved method and apparatus for the generation of electrical energy by thermonuclear processes has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiment.

I claim:

1. An apparatus for heating and compressing plasma comprising a housing, a plurality of parallel theta pinch reactor assemblies mounted in said housing, each reactor assembly comprising a vacuum chamber, respective plasma sources and means for generating and simultaneously injecting plasmoids into opposite ends of each of said vacuum chambers, including conical theta pinch coil means on the opposite ends of the chambers, common magnetic coil means surrounding the housing for generating a primary steady state magnetic guide field simultaneously within all said vacuum chambers, said primary guide field being oriented to confine and direct plasmoids to collision approximately at the centers of said vacuum chambers, and means including additional coil means on each of the vacuum chambers in the vicinity of their center portions for compressing plasma in the vicinity of said center portions of the vacuum chambers for a discrete period of time beginning with each plasmoid collision event, wherein said housing includes a plurality of spaced parallel bulkhead plate members supporting said reactor assemblies in parallel relationship and formed with aligned apertures slidably receiving said reactor assemblies, and wherein said housing has a wall portion located adjacent one end of each of the reactor assemblies and being provided with respective removable closure means for at times providing access to said reactor assemblies.

2. The apparatus of claim 1, and wherein said plasma sources generate plasmoids in the form of plasma vortex structures.

3. The apparatus of claim 2, and wherein said additional coil means for compressing the plasma includes means for providing secondary magnetic mirror fields having the same polarity as the polarity of said primary steady state magnetic guide field.

4. The apparatus of claim 1, and meltable metal blanket means on the inside wall surface of said housing, surrounding said vacuum chambers for collecting heat and reacting with free neutrons generated by the plasmoid collision events.

5. The apparatus of claim 4, and wherein said metal blanket means comprises metal which liquifies responsive to thermonuclear heat energy, and means to circulate the liquified metal externally of the housing for utilizing said heat energy.

6. The apparatus of claim 1, and wherein said common magnetic coil means is of the superconducting type and is provided with cooling means.

7. The apparatus of claim 1, and wherein said common magnetic coil means is provided with a cryogenic cooling jacket.

* * * * *

UNITED STATES PATENT AND TRADEMARK OFFICE
CERTIFICATE OF CORRECTION

PATENT NO. : 4,342,720
DATED : Aug. 3, 1982
INVENTOR(S) : Wells

It is certified that error appears in the above–identified patent and that said Letters Patent are hereby corrected as shown below:

Column 3, line 59 delete "$B_{74}$" and insert therefor --$B_\theta$--.

Column 3, line 60 delete "$B_\theta$" and insert therefor --$B_\phi$--.

Signed and Sealed this

Twenty-eighth Day of June 1983

[SEAL]

Attest:

GERALD J. MOSSINGHOFF

Attesting Officer     Commissioner of Patents and Trademarks